United States Patent [19]

Wallinder

[11] Patent Number: 6,049,712
[45] Date of Patent: Apr. 11, 2000

[54] ARRANGEMENT SYSTEM AND METHOD RELATING TO TELECOMMUNICATIONS ACCESS AND CONTROL

[75] Inventor: Sören Wallinder, Haninge, Sweden

[73] Assignee: Telefonaktiebolaget LM Ericsson, Stockholm, Sweden

[21] Appl. No.: 08/990,371

[22] Filed: Dec. 15, 1997

[30] Foreign Application Priority Data

Dec. 16, 1996 [SE] Sweden ................................. 9604601

[51] Int. Cl.[7] .......................... H04M 3/42; H04M 11/00
[52] U.S. Cl. .................... 455/414; 455/411; 379/93.03; 379/283; 379/361
[58] Field of Search .................................. 455/414, 410, 455/461, 403, 411; 379/93.02, 93.03, 283, 361; 340/825.44

[56] References Cited

U.S. PATENT DOCUMENTS

| | | | |
|---|---|---|---|
| 5,239,294 | 8/1993 | Flanders et al. | 340/825.34 |
| 5,282,250 | 1/1994 | Dent et al. | 380/23 |
| 5,305,372 | 4/1994 | Tomiyori | 455/564 |
| 5,325,425 | 6/1994 | Connolly et al. | 455/435 |
| 5,390,245 | 2/1995 | Dent et al. | 380/23 |
| 5,481,595 | 1/1996 | Ohashi et al. | 379/88.27 |
| 5,509,060 | 4/1996 | Hall et al. | 379/207 |
| 5,546,523 | 8/1996 | Gatto | 345/352 |
| 5,559,886 | 9/1996 | Dent et al. | 380/23 |
| 5,613,214 | 3/1997 | Shirasawa et al. | 455/411 |
| 5,668,876 | 9/1997 | Falk et al. | 380/271 |
| 5,694,464 | 12/1997 | Mashinsky | 379/355 |
| 5,721,780 | 2/1998 | Ensor et al. | 380/25 |
| 5,745,559 | 4/1998 | Weir | 379/199 |
| 5,787,154 | 7/1998 | Hazra et al. | 379/93.03 |
| 5,793,762 | 8/1998 | Penners et al. | 370/389 |
| 5,812,948 | 9/1998 | Hjern et al. | 455/435 |
| 5,826,019 | 10/1998 | Ronstrom | 709/201 |
| 5,852,776 | 12/1998 | Ohlsson | 455/406 |
| 5,862,480 | 1/1999 | Wild et al. | 455/432 |
| 5,884,161 | 3/1999 | Hegeman | 455/414 |
| 5,901,284 | 5/1999 | Hamdy-Swink | 340/825.32 |
| 5,903,832 | 5/1999 | Seppanen et al. | 455/414 |
| 5,907,597 | 5/1999 | Mark | 379/93.03 |
| 5,909,650 | 6/1999 | Jonsson | 455/461 |
| 5,915,225 | 6/1999 | Mills | 455/558 |
| 5,937,343 | 8/1999 | Leung | 455/403 |

FOREIGN PATENT DOCUMENTS

| | | |
|---|---|---|
| 4303996 | 8/1994 | Germany . |
| WO94/01958 | 1/1994 | WIPO . |
| WO96/04741 | 2/1996 | WIPO . |
| WO96/05683 | 2/1996 | WIPO . |

*Primary Examiner*—Nguyen Vo
*Assistant Examiner*—Charles N. Appiah
*Attorney, Agent, or Firm*—Burns, Doane, Swecker & Mathis, L.L.P.

[57] ABSTRACT

An arrangement relating to telecommunication access and control. An arrangement is provided at least for providing access information for protected subscriptions to at least one telecommunications system which requires the giving of access code information. The arrangement comprises a portable telecommunications unit which includes processing devices, storing devices and loudspeaker devices. The existing processing devices, storing and loudspeaker devices of the portable telecommunications unit are used for transmitting at least DTMF-coded access code information to a communications arrangement to provide access to a number of telecommunications systems.

26 Claims, 9 Drawing Sheets

ARRANGEMENT SYSTEM AND METHOD RELATING TO TELECOMMUNICATIONS ACCESS AND CONTROL

BACKGROUND

The present invention relates to an arrangement at least for providing a user with access to a communications system or network supporting personal mobility wherein said access is protected. The invention thus relates to providing a user with access to a subscription e.g. from his own or from an arbitrary communications terminal wherein the giving of access code information is required, particularly coded in DTMF (Dual Tone Multi Frequency), i.e. the user must in some way identify himself or rather his entitlement to use the subscription. The invention also relates to a system for providing a user with access to telecommunications services. Still further the invention relates to a method for accessing a protected telecommunications system, i.e. to get access to a subscription to at least one telecommunications system, e.g. system or network mobility.

The invention also relates to an arrangement, system and method, respectively, supporting enhanced functionality for controlling and making outgoing calls.

When a user wants access to e.g. a subscription of a communications system using e.g. any telecommunications unit or terminal, i.e. when the subscription relates to the subscriber and not to a given terminal or a fixed terminal, the user has to identify himself or give such information so as to show that he is entitled to use the subscription and account information. For example Universal Personal Telecommunication (UPT) supports personal mobility in so far as a user being entitled to use a subscription (or the subscriber if the subscriber is also the user; a subscription may allow one or more than one user to use the subscription) can use any telecommunications unit or terminal to make and/or receive calls irrespectively of which terminal is at his disposal at the time. The UPT mobility support network (or the UPT telecommunications system) supports one or more of e.g. a fixed telecommunications network such as a public switched telecommunications network (PSTN), a cellular network (MCN) or a private telecommunications network (PTN). A user can then access the UPT subscription which he is entitled to access over a normal DTMF signal e.g. via a fixed telephone. To access a UPT subscription a user first has to dial the UPT access number. Thereafter the user must identify himself. For this purpose a personal user identity (PUI) code has to be entered. For reasons of security a so called personal identification number (PIN) has to be entered thereupon. Thus, not only the user has to enter the UPT access number but also the PUI- and the PIN-code respectively. The PUI- and the PIN-code may require the giving of up to e.g. 24 digits. The entering of such an amount of numbers is cumbersome. Furthermore, in addition to being a waste of time, it is not always easy to remember all the digits of the respective codes bearing in mind that they have to be kept safely somewhere. Therefore they may often have to be written down somewhere, which for reasons of security is not a very satisfactory solution.

Therefore the sending of the code information has been simplified through the introduction of a device in the form of a separate apparatus which comprises means for storing (coded in DTMF) e.g. the PUI code and the PIN code. The apparatus further comprises a loudspeaker through which the stored authentication information can be emitted.

Thus, if the user uses a fixed telephone terminal for accessing his UPT subscription and, after having entered his UPT number, a UPT database in an intelligent network (IN) node, e.g. a so called Service Control Point SCP, requests the user to give the PUI- and PIN-codes. The user then places the apparatus close to the microphone of the fixed, e.g. PSTN, telephone, activates the device and transmits the stored information.

However, it is a clear disadvantage of the known solution that a separate device is required. Today a user who wants to be reachable most of the time and who wants to be able to make e.g. a telephone call in principle from anywhere and at any time, mostly is in possession of a cellular mobile telephone. Thus in principle he would need to have both the abovementioned device and a cellular telephone at his disposal most of the time.

However, irrespectively of whether the user is in possession of a cellular telephone or not, he has to carry around his apparatus for accessing his (or the intended) UPT-subscription, said apparatus in any other aspect being of no use whatsoever.

WO 96/04741 and WO 96/05683 show autodialling devices for automatically dialling telephone numbers and a smart card capable of being acoustically coupled to a telephone respectively. However, both these devices are separate apparatuses substantially similar to what was described above.

DE-A-4 303 996 shows the use of a mobile telephone of the mobile network DCS-1800 as a DTMF-sender for accessing a communication service. However, if the user of the telephone goes abroad there is a problem since from different countries, different access numbers are required. This means that the user has to bring the information e.g. on a list or similar about which are the access codes from different countries. If he loses the list, access is not possible. Furthermore, if the user is in a country in which there is no coverage for DCS-1800, he can neither use his telephone, nor access his UPT-subscription in an easy manner.

SUMMARY

What is needed is therefore an arrangement and a system respectively which is useful for more than one purpose in contrast to a separate, additional item that the user has to keep only for a single purpose while still enabling facilitated access to a particular subscription or a protected access to one or more communications networks and without requiring a user to keep in his memory, or written down somewhere for easy retrieval, several codes which have to be given each time the subscriber or the user of a subscription wants to access the subscription or the communications system(s) irrespectively of where the user is, e.g. in the home country or any other country.

A method for facilitated access to a subscription is also needed through which the user can access the subscription the access to which is restricted either to the user himself or to a number of users being entitled thereto without the user having to keep or remember and enter a number of digits representing the appropriate access code information or having to use a particular item or apparatus useful or intended only for this particular purpose.

An arrangement is therefore provided which comprises processing means, storing means for storing DTMF-coded access code information and loudspeaker means. The arrangement comprises a portable telecommunications unit including processing means, storing means and loudspeaker means wherein the existing processing means, storing means and loudspeaker means of the portable telecommunications unit are used for transmitting at least part of the access code information to a fixed (or mobile) arrangement of said at least one telecommunications system which is requested to furnish the required information to a DB of a network node. The fixed or mobile arrangement may for example be a fixed terminal or station such as a PSTN telephone or a mobile telephone of a foreign mobile communication system used in a particular country. Still further the portable telecommunications unit particularly comprises activation means relating to a number of subscriptions to a plurality telecommunications systems wherein activation of said activation means results in transmission of the relevant access code information for providing a user with access to the desired system. The activation means may be in the form of a key, a field on a touch menu area etc. If the arrangement is to enable access to more than one subscription or more than one user, there may be one key or similar for each subscription, or each user etc. Of course also other alternatives are possible than one key for one user/subscription. In one embodiment one SIM card is used for each subscription.

In an advantageous embodiment one communications system comprises a universal personal telecommunications mobility (support) network including cellular communications system(s), fixed communications system(s) etc. Of course it may also include private network(s).

In a particular embodiment the access code information includes network access number and authentication information. Alternatively the access code information only includes authentication information but of course it may also contain other information such as landcodes for access from a plurality of different countries from where the telephone can be used or landcodes to the relevant, i.e. the nearest or the "home" intelligent network node, e.g. a service control point SCP or a combined service switching control point SSCP. Advantageously access code information from countries using other communication network standards than that of the telephone are also included.

In a particular embodiment relating to UPT the access code information comprises the network access number, e.g. UPT access number, the personal user identity, the PUI-code (i.e. an account number) and the personal identification number, i.e. the PIN-code. Thus, when the arrangement is activated for a particular communications system such as for example UPT, the relevant access information is sent to a fixed arrangement such as a fixed telephone or a PSTN telephone via which the access information is requested by a UPT database of an intelligent network node such as a service control point (SCP).

In a particular embodiment of the present invention the arrangement comprises a number of alternative activation means, particularly separate activation means for access to a particular subscription e.g. to a communications system supporting personal mobility and comprising one or more networks, e.g. UPT, and other separate activation means for access to another subscription, e.g. to a private network PTN, UPT and PTN as such forming alternative access alternatives in this case. There may also be other as well as additional alternatives.

In one specific embodiment, there may also be provided activation means for more than one subscription to one and the same access alternative such as UPT or PTN or for more than one subscription (or user) to more than one alternative system etc., given by SIM-cards (Subscriber Identity Module).

An advantageous embodiment of the invention also relates to the provision of first activation means for a first mode of access and second activation means being provided for a second mode of access which modes form alternative modes in so far as the first access mode relates to simplified access from a portable communication unit, the second access mode is used for access to a subscription to a communication system, for example UPT requiring some user interaction.

In an advantageous embodiment authentication is effected internally in an intelligent network node, e.g. a service control point (SCP) included in the universal personal telecommunications system.

In an alternative embodiment authentication is provided externally in an authentication center (AUC) cooperating with a service control point (SCP) or a combined switching service control point (SCCP) forming a logical IN-node of a universal personal telecommunication system.

In a most advantageous embodiment the portable telecommunications unit includes a display on which a user menu is presented when access successfully has been provided, i.e. after the access code information has been emitted and verified.

Advantageously the user menu comprises a voice menu interface for user interaction, a number of alternatives being given on the menu such as for example making outgoing calls, registering the location for incoming calls for example according to a timetable, modification of a service profile, checking of a service profile etc. According different embodiments the menu comprises a graphical menu or a voice menu but it may also comprise a combination of a graphical menu and a voice menu. According to a particular embodiment, the menu is provided on a card to be inserted in a cardreader arranged in the portable communications unit. The portable communications unit may be of different kinds, for example it may be a cordless telephone or a cellular telephone. However, in a particular embodiment the arrangement may also comprise a pager, which advantageously is provided with enchanced functionality, such as the provision of a keyboard which normally is not provided in a pager.

Above it has mostly been referred to UPT, but of course the communications system or systems does not have to be UPT but it can also be any other personal mobility supporting network, e.g. PCS, but it may also simply be a private telecommunications network or a network of private networks. The invention is also applicable and most useful for other accessing/controlling services like account card, call card, personal number services and Virtual Private Network (VPN) services.

The portable telecommunications arrangement such as for example a cellular telephone has ability to store access code information (which particularly is different) for more than one system such as for example one UPT subscription (or more) and one private network subscription (or more in this case as well).

Furthermore a system is provided the object of which is to provide a user with protected access to a telecommunications system supporting personal mobility or in which access to a subscription is provided through transmission of authentication information and possibly also access number coded in DTMF via a fixed (or mobile) telecommunications unit. A portable telecommunications unit such as a cellular telephone or a cordless telephone is used for sending the DTMF coded information to a fixed (or mobile) telecommunications unit and the existing features already present in for example a cellular telephone are used; there is advantageously merely provided for a modification in the software and additional controlling functionality according to various needs. When the cellular telephone or the cordless telephone for example, is activated, the PIN-code and the PUI-code are emitted to an UPT database in for example a service control point, i.e. an intelligent network node, which requests said information via the fixed telephone. When access successfully has been provided, i.e. when the authentication is completed, a service menu is shown on the cellular telephone or the cordless telephone thus enabling user interaction as already further discussed under reference to the arrangement for accessing and controlling a subscription.

BRIEF DESCRIPTION OF THE DRAWINGS

The invention will in the following be further described in a non-limiting way under reference to the accompanying drawings in which.

DETAILED DESCRIPTION

Figure 1:
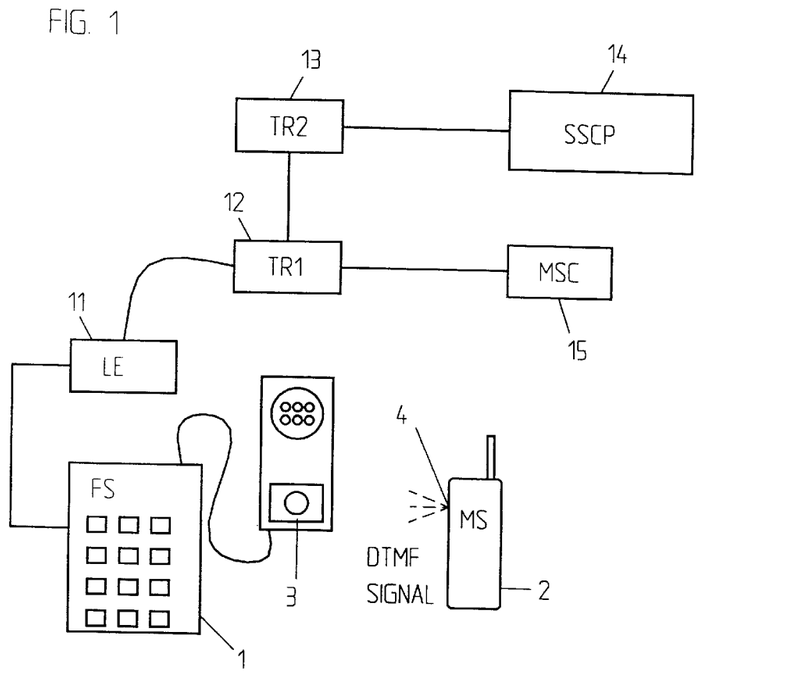
FIG. 1 schematically illustrates use of an arrangement according to the invention for accessing a subscription, FIG. 2 in a simplified manner illustrates a basic network structure supporting UPT.

FIG. 1 shows a fixed telephone (FS) 1 through which a user wants to get access to his UPT subscription (or a UPT subscription which he is entitled to use). The user (the caller) also has a cellular telephone (MS) 2. In the cellular telephone (MS) 2 which comprises storing means (not illustrated in this figure) the user has stored the information required for the provision of access to the UPT subscription such as for example the PUI code and the PIN code. In an advantageous embodiment also the UPT access number is stored in the storing means. The fixed station (FS) 1, e.g. a PSTN telephone, is in the illustrated embodiment connected to a local exchange LE 11 which in turn is connected to a transit exchange TR1 12 which via a second transit exchange TR2 13 is connected to a service switching control point SSCP 14 (in an alternative embodiment it is connected to a service control point SCP via a service switching point SSP which will be further discussed below). The transit exchange TR1 12 is in turn connected to a mobile switching center MSC of a cellular system. As such, the MSC is not relevant for the present invention, it is merely illustrated for purposes of indicating that the cellular telephone 2 can be used also in a conventional manner. When the UPT database in the service switching control point SSCP 14 requests the user to provide the PUI code and the PIN code (of course it does not have to be the PUI code and the PIN code, but it relates to (at least) authentication information in general which of course can take any form, or only be part of the authentication information or include information in addition to the authentication information) the caller or the user places the cellular telephone 2 close to the microphone 3 of the fixed telephone 1, i.e. the microphone when the telephone is off hook or if it is a loudspeaker telephone, close to the microphone on the fixed part of the telephone. When activated for UPT access, the cellular telephone MS 2 then emits the relevant stored information coded in DTMF through its loudspeaker 4.

In FIG. 1 the arrangement used for emitting PIN code and PUI code information to the fixed telephone comprises a cellular telephone 2. However, it does not have to be a cellular telephone but it can also be a cordless telephone in which case the loudspeaker of the cordless telephone is used to emit the relevant information, particularly the authentication information. Also in this case it is possible to emit access number (for example UPT access number) and authentication information comprising e.g. PIN and PUI but it is also possible that only PUI and PIN, coded in DTMF, is emitted in which case UPT access number in a manner known per se is first dialled on the fixed terminal FS or manually dialled on the cellular or cordless telephone depending on whether the FS is an analogue station (in which case UPT access number as well as PUI and PIN can be sent) or a digital or ISDN station, in which case the UPT access number is first dialled manually on the FS.

The invention particularly relates to providing access to a system providing personal mobility such as UPT or PCS (Personal Communications System). However it can also be applied for providing access to a private telecommunications network PTN and other services as referred to earlier in the description. It is advantageously also applied for controlling telecommunications services.

However, the invention will in the following mainly be described under reference to UPT. The function is similar also when other systems are to be accessed, the skilled man will appreciate this and that the relevant authentication information for such cases will be stored, emitted etc. In UPT a user, or a subscriber, has a personal number that can be kept for any time irrespectively of whether the user moves to another town, country etc. Thus a call to a UPT user is performed using the personal number instead of numbers which depend on which terminal is used, or the geographical location etc. This means that the location or the terminal where a UPT user currently is available can be hidden for the caller (of course in a particular embodiment a service may be implemented, if the user so wishes, which indicates for example which terminal is used, from where the call is done, from which country etc.). Alternatively this can be a service available to the caller which in this case may be prevented from implementation by the user if the user prefers that no information is given. A UPT user, or subscriber, therefore has a personal service profile which comprises services which are applicable independently of which terminal is used or on which terminal the UPT user is available at the moment. A UPT user therefore can use any terminal to make or receive calls regardless of which telecommunications network or terminal is available for the moment such as for example PSTN, a private network (a business network) or a cellular network. A user can access the UPT subscription (the subscription of the user or a subscription that the user is entitled to use) directly via a DTMF telephone or via a cellular telephone or a cordless telephone emitting the relevant DTMF coded access information as discussed above.

A UPT mobility support network is based on intelligent network (IN) technology, the intelligence mostly being provided in an intelligent network node, for example a service control point SCP or a service switching control point SSCP. An intelligent network is e.g. specified by ITU-T in the Q.1200 Series and the ETST-Signalling Protocols and Switching (i.e. defined by ETSI; European Telecommunications Standard Institute), the Intelligent Network Application Protocol INAP etc. An intelligent network comprises among others the following nodes: the Service Switching Point, SSP, the Service Control Point, SCP and the Service Data Point, SDP. The Service Switching Point SSP contains capability to detect requests for IN-services or IN-processing. It is also capable of communicating with other physical entities which comprise a service control function such as for example a service control point SCP. It also is capable of responding to instructions from such other physical entity. Functionally the service switching point SSP among others comprises a call control function, a service switching function and it may also act as a local exchange.

The Service Control Point SCP comprises Service Logic Programs SLPs which are used to provide Intelligent Network services, in short IN-services. It may contain customer data but it is not necessary. An SCP comprises service control functions and may optionally comprise service data functions. Multiple service control points may contain the same service logic programs and the same data to improve service reliability and to facilitate load sharing between the service control points. For communication between different nodes signalling system number 7 (ITU-T) is advantageously applied. For communication between intelligent network nodes and mobile nodes of a cellular network an intelligent network application part INAP protocol is advantageously applied; this will, however, not be further discussed here since this is known per se. If thus an incoming call from e.g. PSTN or a cellular network has to be processed or treated by the intelligent network, the call will be routed to the Service Switching Point SSP wherein the Service Switching Functions collect all data that is needed. The data is then forwarded by the service switching functions to the Service Control Point SCP. In the Service Control Point SCP service interpretation and execution is then carried out.

A UPT subscriber is the person or the organization that is responsible for the subscription. The UPT subscriber and the user can be the same person but the UPT subscriber can also be for example an organization having in principle any number of users. Thus, in the latter case the user is not the subscriber but a user entitled to use the subscription.

Figure 2:
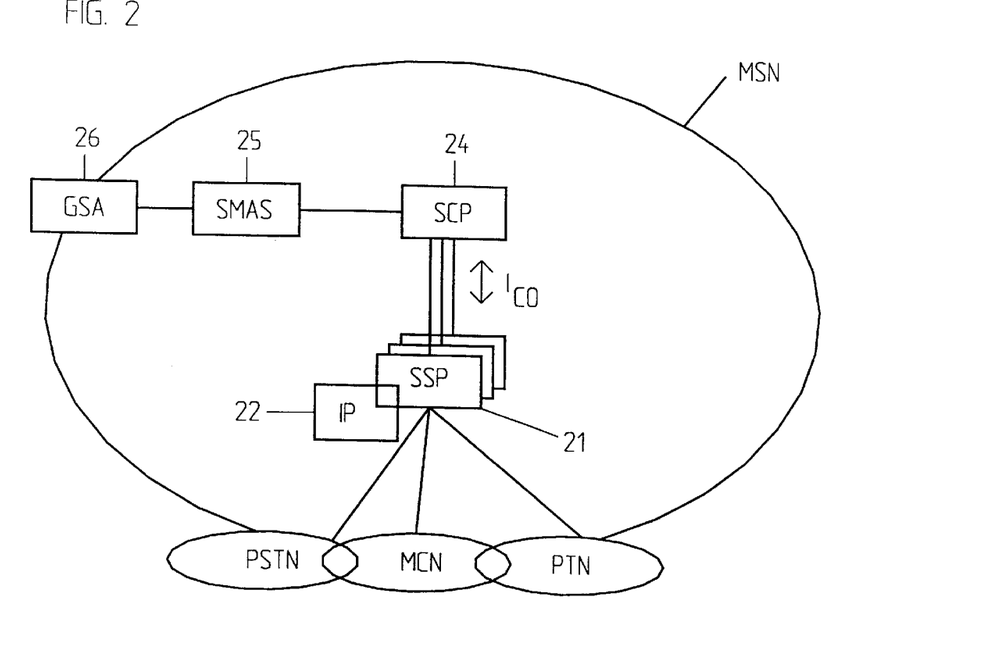
Figure 3:
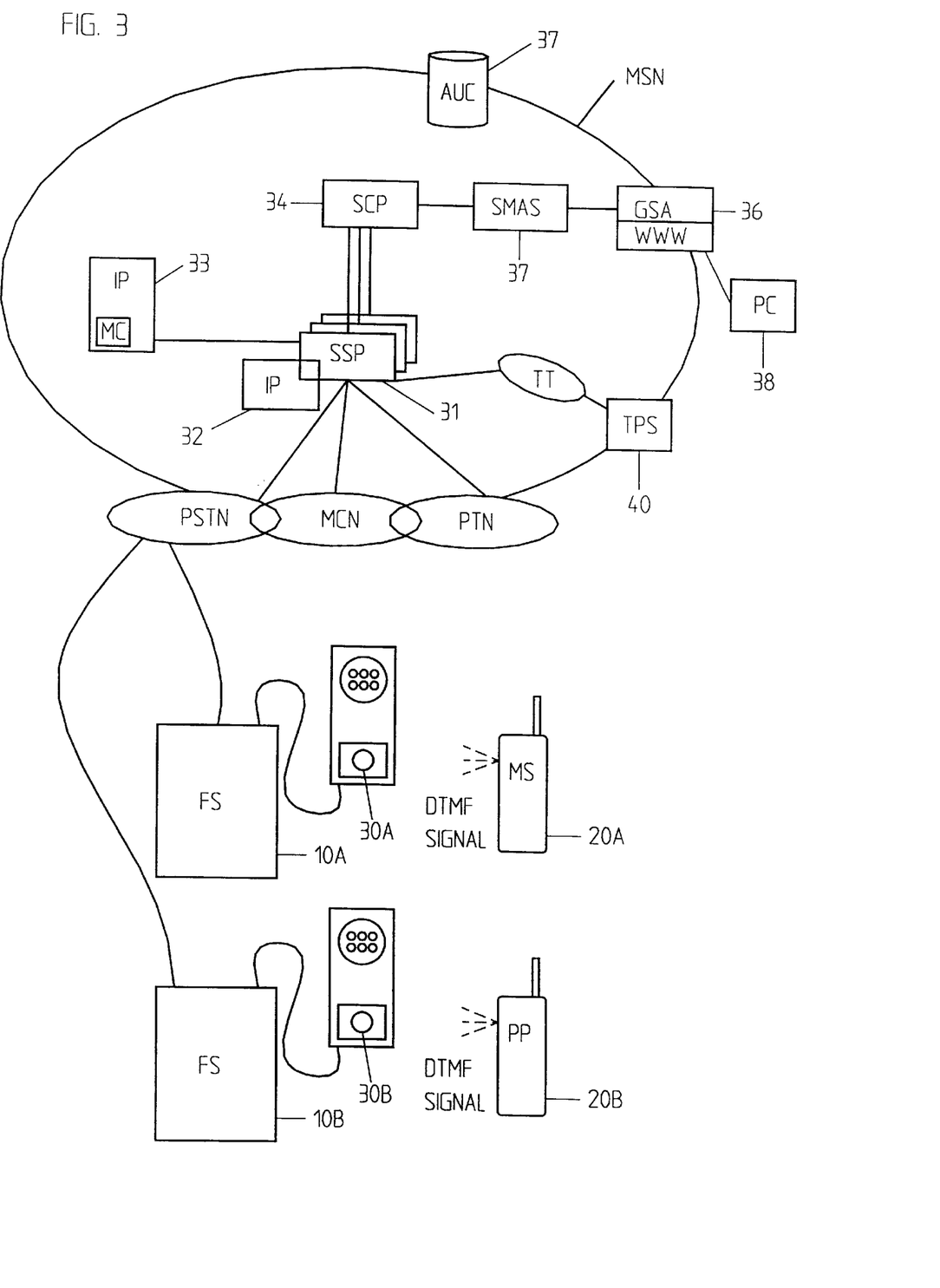
FIG. 3 illustrates another implementation of a network structure, FIG. 4 schematically illustrates access with the use of an arbitrary terminal, FIG. 5 schematically illustrates simplified access from a user terminal.

In FIG. 2 a Mobility Support Network MSN is schematically illustrated supporting a fixed network PSTN, a cellular network MCN and a private network or a business network PTN. Of course any configuration is possibly including one or more of each of the different categories of networks as well as none of one or more of the categories. Service switching points SSPs are e.g. comprised in the cellular network MCN or in PSTN and in turn connect to service control points SCPs. $I_{co}$ indicates data or control signals sent in both directions between SSP 21 and SCP 24. These signals establish whether the intelligent peripheral IP 22, which is an announcement center, comprises announcements. IP is controlled by voice menu override announcements; i.e. voice menu override announcements (to be further explained below) have precedence over other announcements. The SCP controls IP and SSP and thus the main menu, which will be discussed below. In FIG. 2 the service control point SCP 24 is in connection with an administration system SMAS 25 connecting to a generic service adapter GSA 26 which is a tool for handling service administration; this is, however, not relevant for the invention as such. For access to UPT, if calling an UPT database from a cellular telephone, the information, i.e. UPT access number and authentication information can be sent via normal signalling from the cellular telephone. Alternatively and in particular cases the cellular telephone can be used for providing access via a fixed telephone as described above. Then should however be noted that radio contact is not a precondition, i.e. it is not required at all which is a clear advantage. Thus, when access is to be provided via a fixed telephone (or fax or computer etc.), a cellular or a cordless telephone emitting the required access code information is used as discussed above under reference to FIG. 1. This is however not illustrated in FIG. 2 for reasons of clarity. It is however illustrated in FIG. 3 which schematically illustrates an alternative network structure. In FIG. 3 the authentication is done externally in an authentication center AUC 37 in which case an authentication request is sent from the service control point SCP 34 to the authentication center AUC 37 in which the PUI- and the PIN-codes are stored. The AUC 37 returns the result of the validation of the PUI/PIN combination to the service control point SCP 34 controlling SSP 31 and IP 32 (or a SSCP as discussed in the foregoing). External authentication can be used also in the embodiment according to FIG. 2, but internal authentication can in both cases be applied. When internal authentication is used, the PUI and the PIN codes are stored together with other subscription data in the service data function of the SCP. In FIG. 3 the generic service adapter (one or more GSAs, www; world wide web) 36 via SMAS 35 handle PC applications PC 38. Furthermore the service switching point SSP is connected to an intelligent peripheral IP 33 including a message center MC. This IP is an external IP. There may be more than one external IP, e.g. up to five in one embodiment. These may belong to one or more operators.

TT 39 refers to Toll Ticketing, whereas TPS 40 is a Toll Processing System. These are, however, insignificant for the functioning of the present invention and merely shown for illustrative purposes. The PIN code may be provided to AUC 37 via the cellular network. PIN may be encrypted in AUC. The MS processor is brought to operate coordinated with AUC if encrypted PIN code information is used.

In FIG. 3 is also shown how MS 20A emits access code information to the microphone 30A of FS 10A and how PP (cordless telephone) 20B emits access code information to the microphone 30B of FS 10B in order to illustrate that a cellular telephone as well as a cordless telephone can be used.

User access to a UPT subscription will now be more thoroughly discussed with reference to FIGS. 4 and 5 respectively. A user can access an UPT subscription in different ways, e.g. through dialling the UPT access number if access is to be provided from an arbitrary terminal which also is denoted general access. This is further described with reference to FIG. 4.

Another way of accessing relates to dialling an UPT quick access number. This can e.g. be used if access is to provided from dedicated terminals or user proprietary terminals like the home terminal, work terminal or a mobile terminal of the user. This is further described with reference to FIG. 5.

Figure 4:
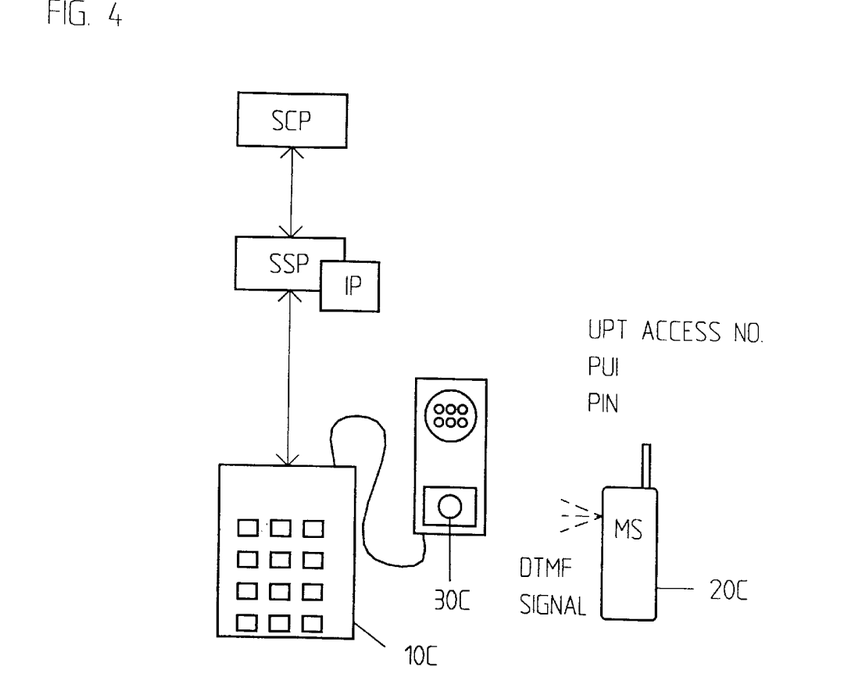

In FIG. 4 the UPT access number is first provided by the user, i.e. here via the cellular/cordless telephone 20C to the microphone 30C of FS 10C. Then the UPT database in the service control point SCP requests the user to identify himself. This is done by entering the personal user identity PUI. The user must then enter a personal identification number, the PIN code (e.g. 4 or 6 digits) for reasons of security. According to the invention this is also provided for through DTMF-signalling from the cellular/cordless telephone. The combination of the PUI and the PIN codes is used to authenticate the UPT user which can be done internally or externally as discussed above. When the authentication is completed, access has been provided and for example a menu is presented to the user. If a user enters the wrong PIN more than a given number of times following on each other, the access will be blocked. After blocking only the UPT service provider can open the service, i.e. enable access. Particularly the number of digits in the PUI and the PIN codes could be up to over 50 depending on what the particular product supports. The number of digits should be sufficient to cover the number of users in a secure way. The more digits, the more complicated for the user and the longer transmission time is required. Therefore, it is desirable to keep the number of digits low; the security aspect, however, may lead to a high number. The arrangement according to the invention is then particularly advantageous. Furthermore, particularly if encrypted code information is used, the arrangement is of significant importance. Thus, among others, when a terminal for some reason is restricted from DTMF capabilities or in connection with a voice menu override functionality or as a simplifying alternative through which the user does not have to dial so many digits and also reducing the risk of giving the wrong digits thus risking a blocking of the service access etc., a cellular telephone (or a cordless telephone or in another particular embodiment a paging arrangement) in which the relevant code data is stored, is activated and the relevant authentication information is emitted to the FS 10C. According to alternative embodiments also the UPT access number can be stored and emitted from the cellular telephone etc., but in one embodiment it is done upon request. Thus, the cellular telephone is programmed with the most frequently used digit sequences. In most advantageous embodiments functionalities of the cellular telephone (for example) relating to storing of outgoing call sequences, B-numbers, can be applied. Thus, this information can be fetched from storing means and emitted in the same way as access code information, etc. Also in other aspects the conventional functionality of e.g. a cellular telephone can be used. Advantageously the cellular telephone shows the UPT menu which, however, will be further discussed below. This of course also applies to a cordless telephone or in some cases also to a paging unit.

As discussed in the foregoing, in case of e.g. an ISDN FS, the access code is given manually on the FS first. This may for example also be used from countries which do not provide for UPT free of charge access numbers. Then it is not needed to wait for voice guidance. First the national carrier (depends on operator) is dialled. Thereafter the country code is given for the country where the UPT user is registered. Upon request, the authentication information is then emitted by the MS. For a number of countries a cellular telephone automatically detects and connects "to that country", which e.g. is shown on the display. This functionality of a cellular telephone is advantageously used. Thus, the giving of the country code is not required in so far as there is radio coverage. Otherwise, the country code has to be given.

In a particularly advantageous embodiment access numbers from a number of different countries (or even all countries from which there is one) are stored in the storing means of the portable telecommunications unit. The storing can be provided for in different manners. The existing storing means may be used as well as separate storing means. Since new access numbers are added from time to time, access numbers are altered etc. updating can be provided for in different manners. Updating can be provided manually by the user, by an operator or via Internet. When a user is abroad, he does not have to keep information about which access number is to be used from a particular country, or a particular location, once that information is already contained in the portable telecommunication unit. In one embodiment the user manually indicates from which country he wants access and processing means of the mobile unit then links the indicated information with the stored access number. The DTMF-coded access number is then automatically transmitted or some further activation command is needed, e.g. the activation of a key.

In one embodiment a scrolling functionality is implemented, indicating different countries to the user who then activates a key when the relevant country is indicated (visually or audially), or the user may indicate a letter code, the giving of which leading to presentation of different countries starting e.g. with a particular letter or similar in alphabetical order.

As referred to above a functionality that exists in a mobile telephone providing automatical detection of location can be used and in that case it is sufficient to activate the telecommunication unit and the appropriate access number is automatically transmitted. This is however on condition that the user is in a country using the relevant system or that there is radio coverage.

However, irrespectively of whether the country in which the user is uses the mobile system of the telephone, the access number to e.g. UPT from that country is contained in the storing means. Then user interaction is needed as referred to above. The sending of DTMF-coded access information does not depend on radio coverage. Still further, even if a user is not a subscriber of e.g. GSM but the telecommunication unit is a GSM-telephone, the functionality of transmission of DTMF-coded access information e.g. to UPT (including country dependent access numbers) is available. (Of course GSM is just one example.) If for example a GSM-user from Europe visits USA, he can either use his GSM-telephone, with stored information and transmit the access number to UPT via a fixed telephone or he can use e.g. an AMPS-telephone (American Mobile Phone System) and via his GSM-telephone transmit the access code information. (If it is digital, the UPT access number however has to be given manually first.) The user indicates in some way "US" or similar on his phone. In an advantageous embodiment voice controlled input means are used and the user inputs the country information in the form of speech. Means are then provided for linking the input information to the appropriate access number.

Even if, in some cases, a mobile telephone may be used directly for accessing e.g. UPT, it is generally cheaper to use the mobile telephone to provide the access via a fixed station.

Figure 5:
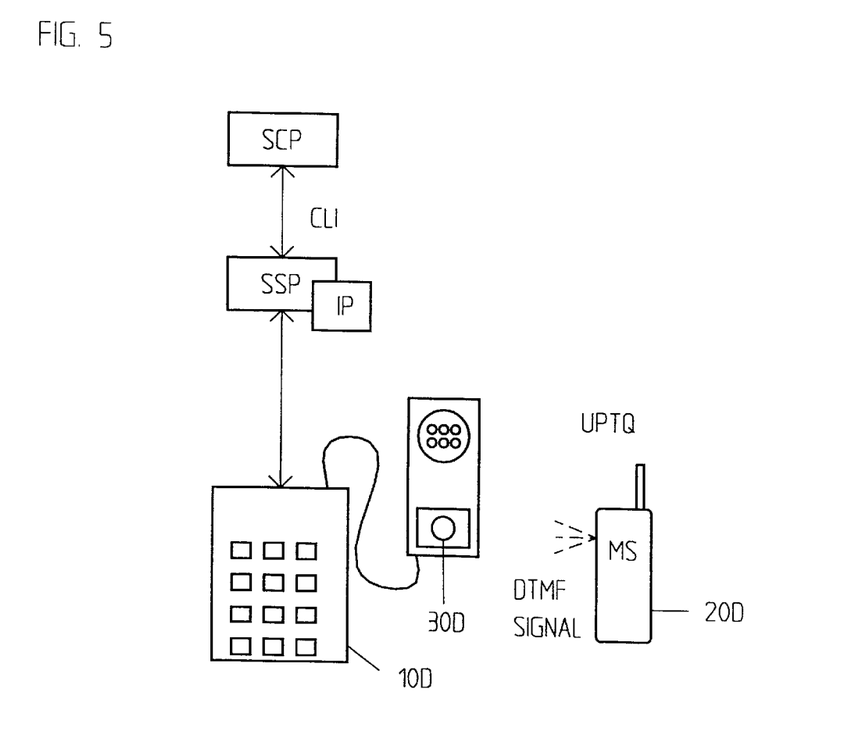

FIG. 5 shows simplified access. Then the quick access UPT access number is provided which is different from the ordinary UPT access number. A calling line identity CLI then gives the identity of the home terminal or the work terminal and the user is then implicitly identified. In an advantageous embodiment the user may have three dedicated calling line identities, i.e. terminals. However, there may be more, e.g. nine. The user can optionally define that the PIN code must be given for certain calling line identities CLI.

In the implementation of the present invention also the quick access number is stored in the cellular/cordless telephone according to this embodiment and this is activated for example by pressing a key different from that when general access is to be provided.

In a most advantageous embodiment both "normal" access number and quick access number UPTQ are stored in the cellular telephone or the cordless telephone.

Figure 6A:
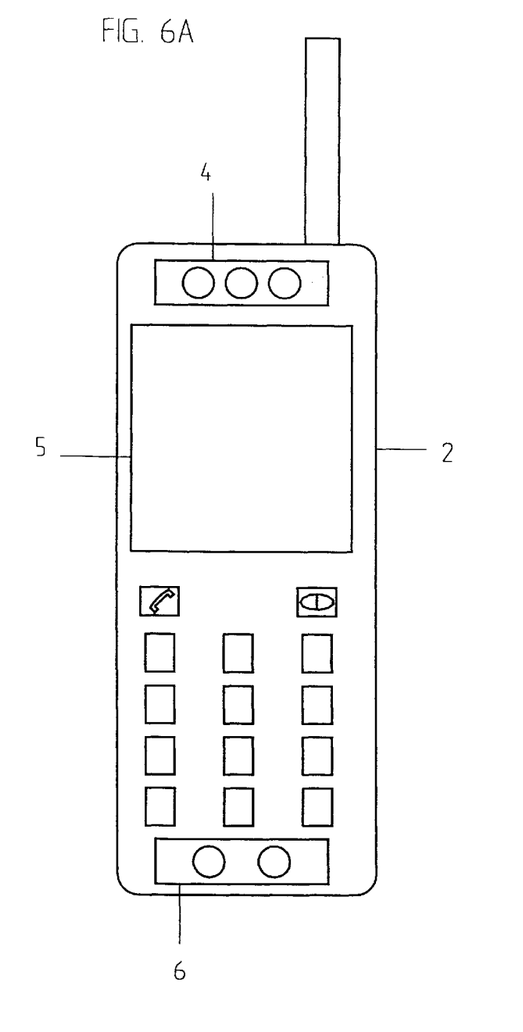
FIG. 6a illustrates an external view of an arrangement according to the present invention in the form of a cellular telephone, FIG. 6b schematically illustrates an internal view of a cellular telephone according to FIG. 6a, FIG. 7 illustrates a voice menu interface according to the invention.

To support handling of the UPT service it is advantageous to include an userfriendly user interface. Therefore the cellular telephone (or the cordless telephone) comprises a full functionality expanded sensitive display. A cellular telephone including such is schematically illustrated in FIG. 6a. The cellular telephone 2 includes a keyboard, a loudspeaker 4, a microphone 6 and a display 5. In FIG. 6a the display 5 is arranged in a conventional manner on the front side of the MS 2. The display 5 is however larger than what is common in order to enable the menu to be shown or handled as will be described below.

In alternative embodiments (not shown) the display is arranged on the backside of the MS, contained in a cover or any other arrangement that is convenient.

Figure 6B:
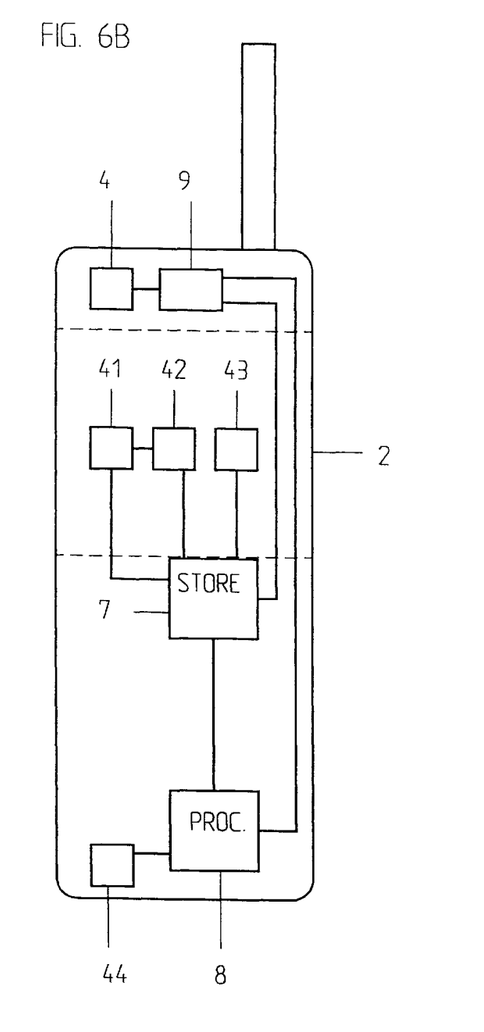

FIG. 6b shows an example of a cellular telephone including processing means 8, storing means 7 and loudspeaker means 4 which are adapted for UPT handling. The DTMF transmitter 9 provides a DTMF signal to the loudspeaker 4. In a simplified manner it is illustrated how the SIM card 44 is arranged and the provision of the information to the transmitter 9. The display unit may e.g. include keys 41, preprogrammed keys 42, (e.g. for simplified access, general access to UPT etc.) and keys 43 for country selection. It should be noted that only the most relevant means are illustrated in a very schematical manner for explanatory reasons.

Figure 7:
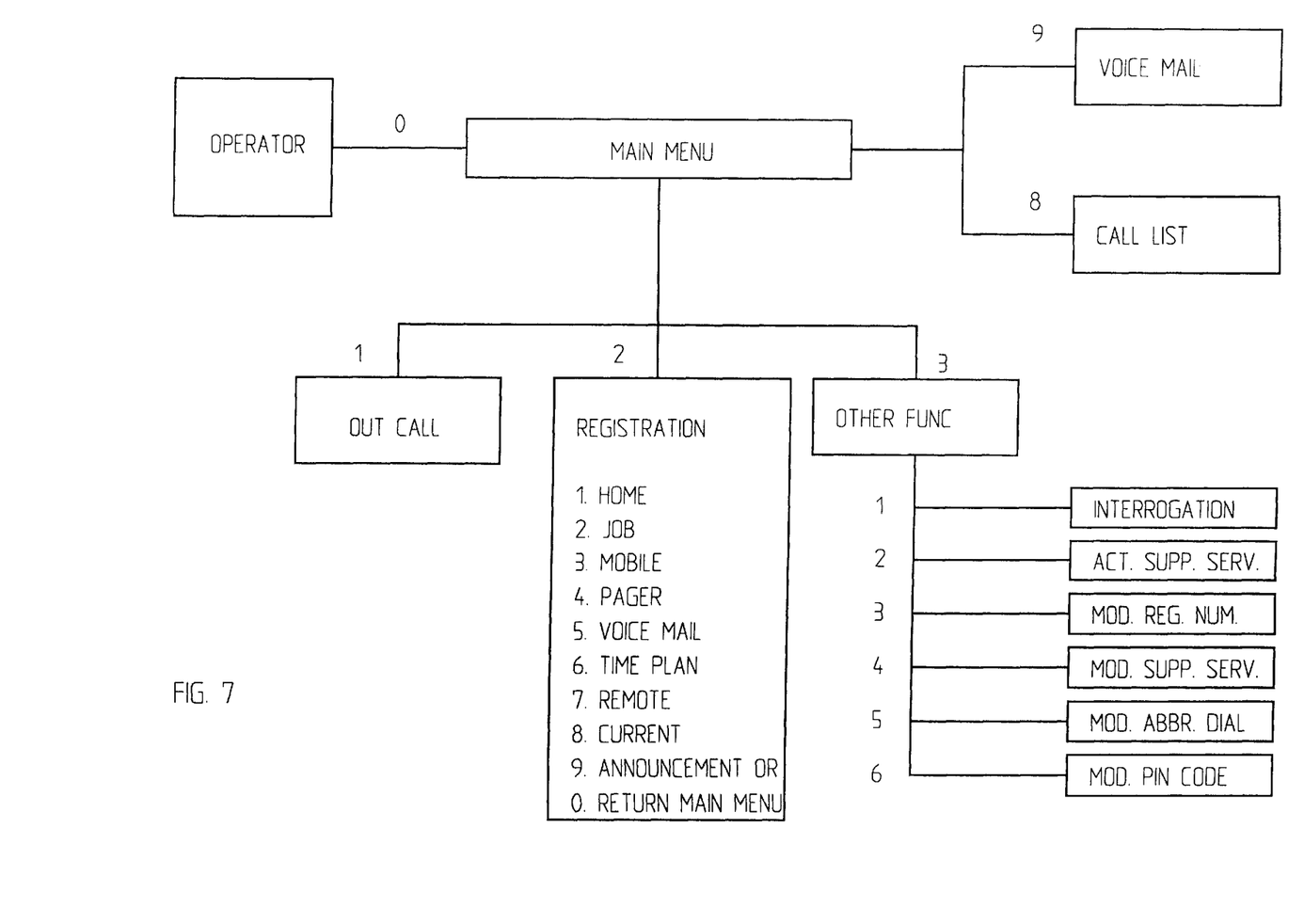

FIG. 7 shows a first example on a voice menu interface. The main menu provides for a number of different alternatives. By pressing a "1", outcall, an alternative is provided through which the user selects to make outgoing UPT calls. "2" refers to registration of incoming calls. This is selected to indicate or change the location for incoming UPT calls. In this case the user can choose between the alternatives home, work, mobile, pager, message center (voice mail), time table (time plan), user entered number (remove), current, i.e. A-number (CLI as discussed above) or a pre-defined fixed announcement. Alternatively the user can return to the main menu. By the third alternative (by pressing the number "3") the user selects other functions. This is used for modifying or checking the status of the UPT service profile. A number of alternatives are then available to the user such as interrogation about the status, the activation of supplementary services, modification of stored numbers, modification of supplementary service data, modification of abbreviated number list and finally modification of the PIN code. The user may press "0" to reach an operator or "9" for voice mail and "8" for call list.

Notifications that can be delivered to the user may for example relate to the service profile having been changed, that the user has been deregistrated, that the user has received voice messages and that the user has received unanswered calls. Of course these are merely examples. In an advantageous embodiment they are presented on the display of the cellular telephone or the cordless telephone used.

The alternative missed calls (on the menu) can be selected if the user wants to get a list of incoming calls which have not been answered. The user can select the message center to get access to the message center for example in order to listen to new messages, that could be a new welcoming message etc. The operator help desk can be selected if the user wants to get in contact with an operator who can help the user for example to handle the service, modify service profile data and so on.

The notifications referred to above can in an advantageous embodiment be announced to the UPT user (on the MS/PP display) before the main menu is presented. The message waiting notification informs the user that there are messages in the message center waiting to be read. The user can then select a message center alternative in order to access a message center. The setting of the message waiting notification depends on the capabilities in the available message center equipment.

The missed calls notification informs the user that there has being calls which have not been answered since the last log-on. The user can then select the next call alternative to get more information about the callers.

The changed service profile notification informs the user that the service profile has been changed since last voice menu log-on. These changes can be performed by the service provider or by the user. The registration overruled indication notification informs the user that "third party" has changed the registration status to the message center. The reason therefor may be that the user has forgotten to change the registration number when leaving "third parties" premises. The user can control or handle the voice menu with the use of a set of voice menu handling functions such as menu interrupt, correction digit, return to main menu, global follow on and voice menu override. Global follow on refers to the case when, after a procedure has been successfully completed, the UPT user is returned to a main menu which by ETSI (European Telecommunication Standard Institute) is denoted "Global follow-on". This allows the user to perform a number of procedures in succession without having to authenticate himself every time. For example the user can make an outgoing call followed by a registration at home without having to perform a new authentication for each procedure.

The voice menu override can be used when specific tasks are to be performed in a fast way. It allows the UPT user to enter the complete string of digits in one sequence when the user hears the first voice-guidance prompt or from the main menu. In this case the cellular telephone or the cordless telephone is programmed with the most frequently used digit sequences or for example including the destination number and making an outgoing call. Then the authentication information is sent whereafter a pause follows and thereupon follow the rest of the digits, for example a given destination number and the digit indicating outgoing call. This menu, however, relates to one example.

Figure 8:
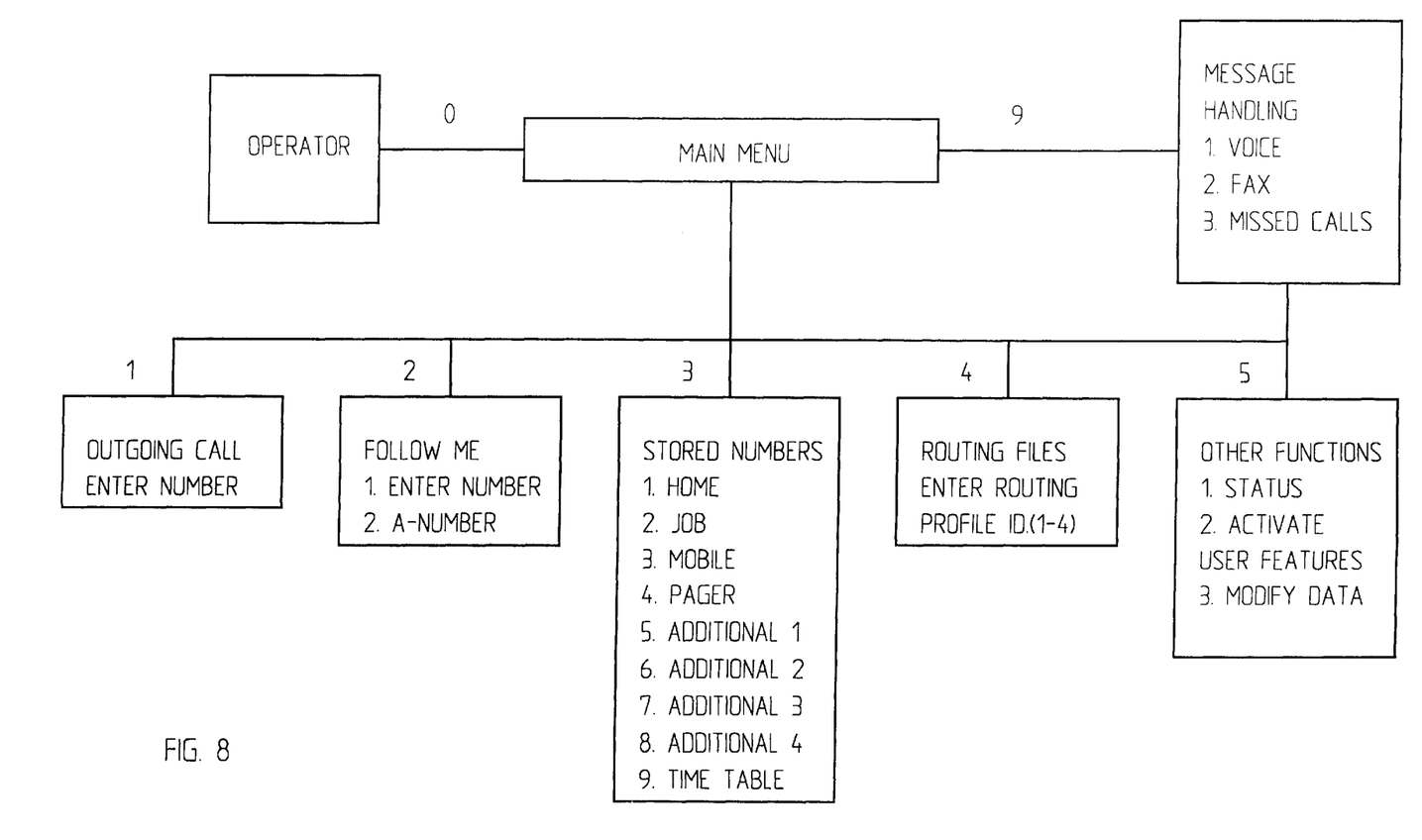
FIG. 8 illustrates an alternative user interface, and FIG. 9 schematically illustrates a flow diagram for simplified access.

In FIG. 8 an alternative main menu is illustrated. Like in FIG. 7 operator, outgoing call, registration under the heading stored numbers (having substantially the same alternatives as the registration alternative in FIG. 7) are given as alternatives. A further alternative, not contained in FIG. 7, relates to routing profiles through which the user can enter a routing profile identification. The other functions are in principle the same as in the embodiment described with reference to FIG. 7. Another alternative relates to the message handling alternative which includes detection of voice, fax and missed calls. In this case is thus also fax included as a part of the UPT service. Fax group 4 calls can in principle be detected via ISDN signalling information and fax group 3 calls can be detected in (for example) two ways. The first way is based on the UPT numbering whereas the other is based on fax tone listening in a separate intelligent peripheral (IP). Fax detection by numbering can be done using a designated digit within the UPT number or as a prefix or a suffix to the UPT number to distinguish voice from fax. If fax detection is done in a separate intelligent peripheral a slight call set-up delay will be introduced since it has to be waited for a fax tone to distinguish voice from fax but on the other hand this is advantageous in so far as a single UPT number can be used for both fax calls and voice calls. However, this can be provided in any convenient manner, every alternative being covered by the present invention. Also in other aspects the services and the menus etc. can take any desired form.

In an advantageous embodiment the UPT access numbers are free of charge numbers. In an advantageous embodiment the UPT service can be accessed from different countries via such free of charge numbers, the storage being provided in the MS/UPT station software. ITU-T has recommended the access number 878 for UPT.

In an advantageous embodiment pre-defined service packages are provided. One or more of them can exist simultaneously on an installed UPT service so that each UPT user or subscriber can choose the service package that best meets his needs. Such service packages can be defined in different manners.

Although the invention has mainly been discussed with reference to the use of a cellular telephone for accessing UPT it should be clear that alternatively a cordless telephone can be used for accessing purposes. Furthermore it does not have to be UPT that is accessed but any personal mobility supporting network or communication system such as for example PCS (Personal Communications System), but it can also relate to access to a private network or a number of private networks.

It should also be clear that in a cellular telephone (or a cordless telephone) access code information for more than one user or subscriber entitled to use the telephone can be included (also for different modes).

In still a further embodiment the arrangement may comprise a paging unit. The paging unit then however must comprise sufficient storing capabilities for storing at least one access alternative and advantageously it comprises a display and depending on which features are desired, it can be provided with some or all the features discussed above under reference to a cellular telephone or a cordless telephone.

Figure 9:
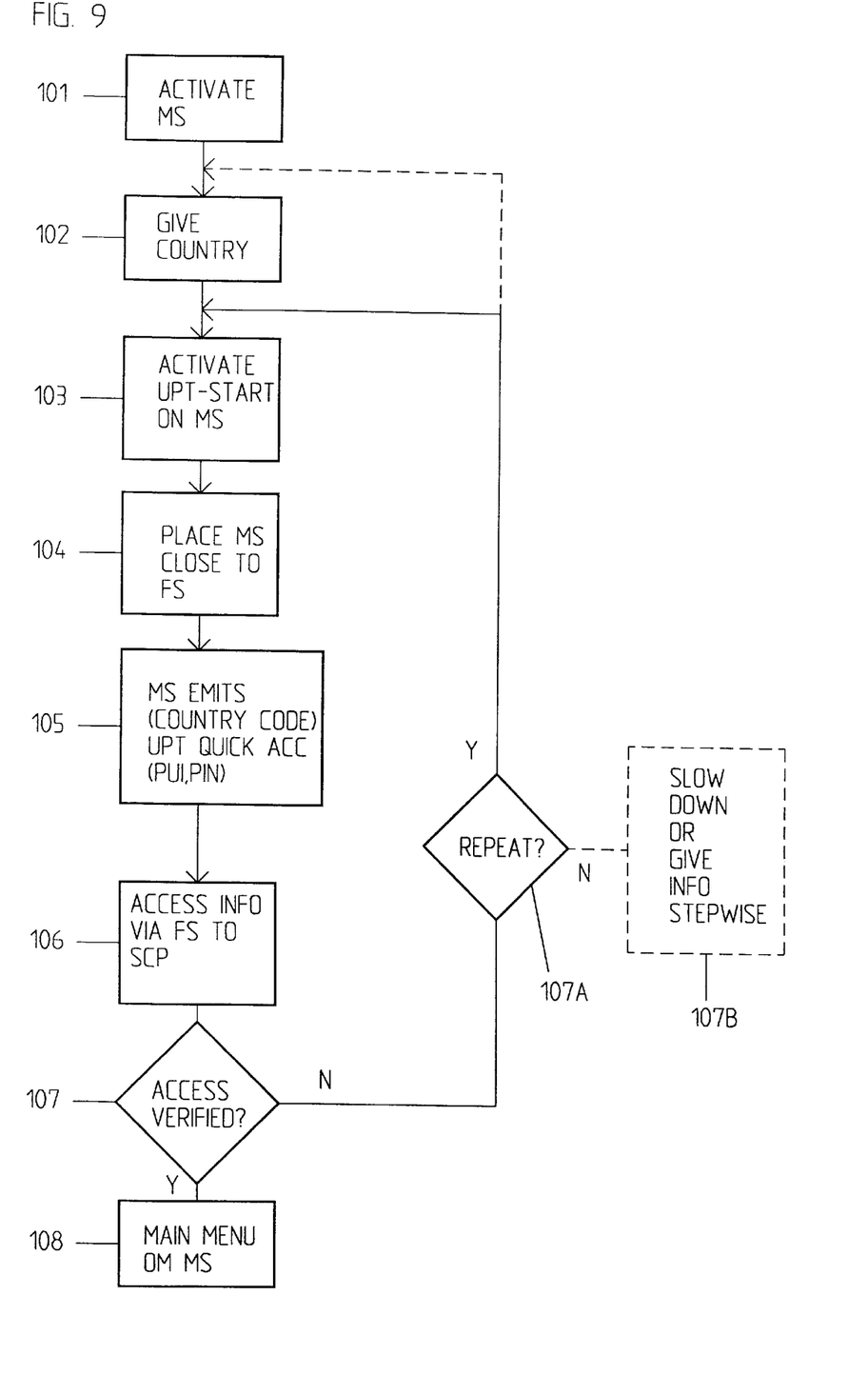

In FIG. 9 relating to simplified access it is supposed that the relevant information is stored in the MS (or PP).

If a user thus wants to access a UPT subscription, the MS is activated, 101. No radio contact is however required. Then country is chosen, 102. This does not have to be done if the user is in his home country. This can be done in different ways; the MS may already be aware of it etc. Alternatively, as discussed earlier in the application, the functionality of a cellular telephone for automatically connecting (and displaying) presence in a country is used. The user then activates for UPT start on MS, 103, and the loudspeaker of the MS is held close to the Fixed Station FS, 104.

The mobile station MS then emits, 105, UPT access number PUI and PIN or just the quick UPT access number. Optionally, PIN is required, in which case also PIN is emitted. The access information is then via the FS transmitted to the relevant SCP, 107. If the access is verified, 107, access is completed and advantageously a main menu is presented to the user. If, however, access is not verified, there are various alternative solutions. E.g. a simple repetition, 107a, may be carried out. Alternatively, the sending of code information may be slowed down or the information may be given in steps, 107b.

Figure 10:
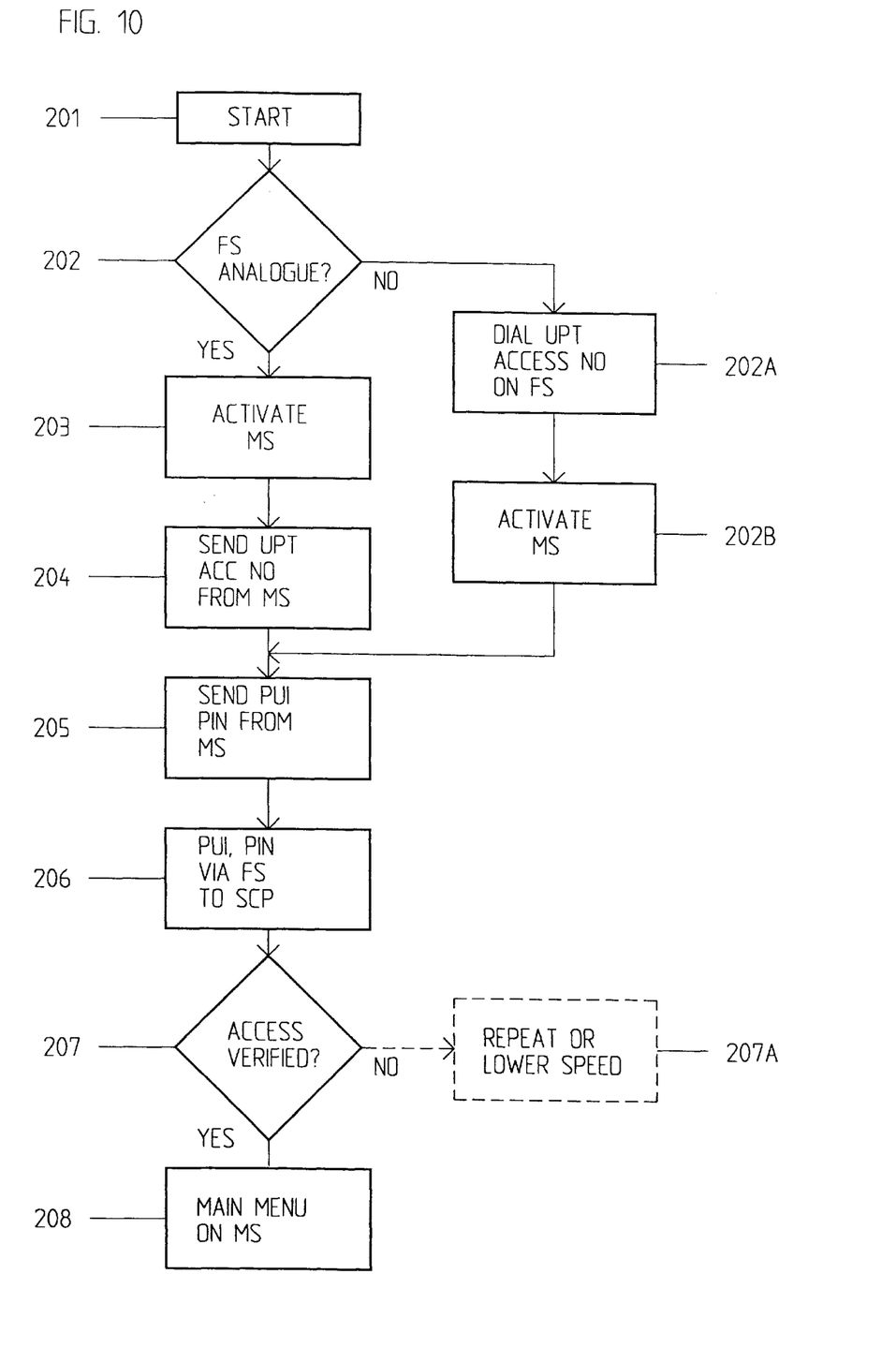
FIG. 10 illustrates a flow diagram for access requiring more user interaction.

FIG. 10 relates to general access. When UPT access is wanted, 201, it is first established whether the FS is analogue, 202. If yes, the MS is activated, 203. The UPT access number is then sent from the MS. If the FS is not analogue, e.g. an ISDN station, the UPT access number is manually dialled on the FS, 202a. The MS is thereupon activated. In both cases, when requested by SCP, authentication information (PUI, PIN) is sent from MS, 205, and via FS sent to SCP, 206. If access is verified, 207, the main menu is presented on MS, 208. If, however, access is not verified, a repetition may be done, the speed may be lowered, etc.

When a user is abroad, access must be provided to the home service node. A mobile station (e.g. of GSM) contains a roaming capability in a large number of countries and can automatically identify the visied country in a manner known per se. As discussed earlier, this functionality can be used to automatically dial out the access number that is relevant for the visited country.

Figure 11:
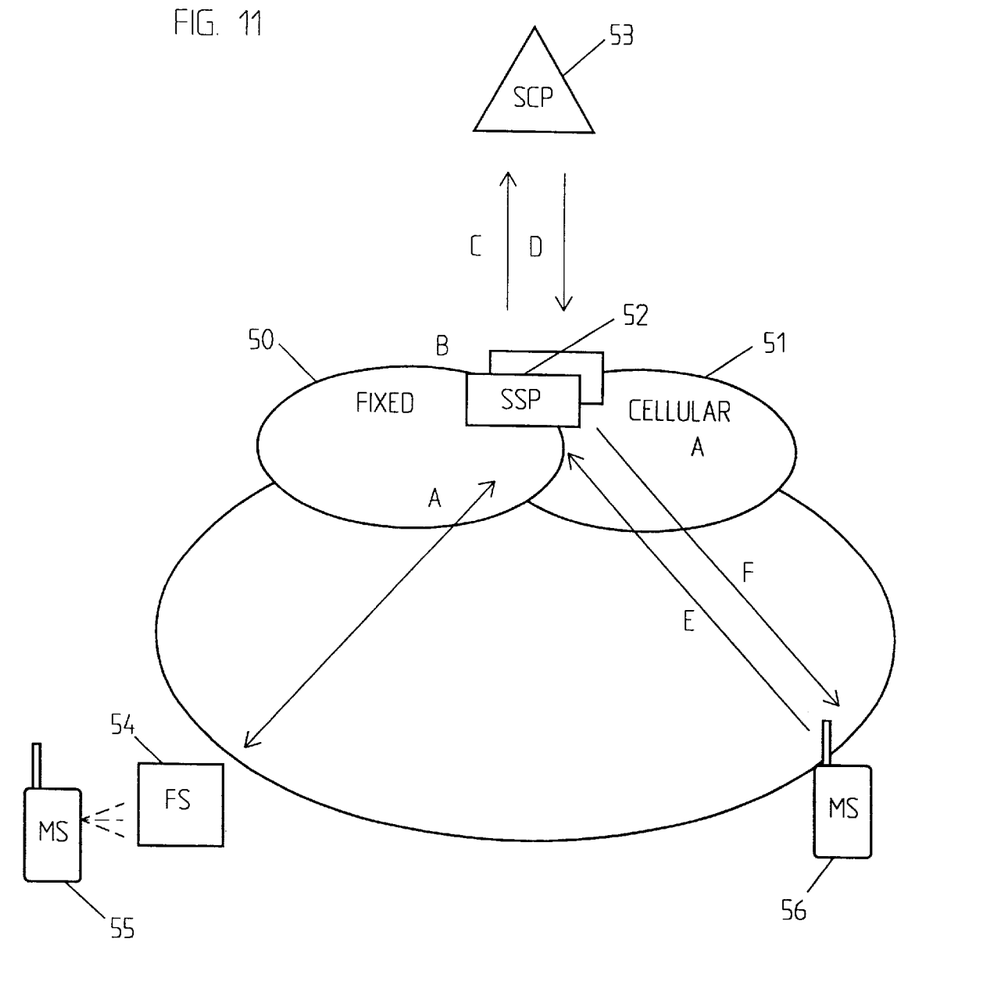
FIG. 11 illustrates the accessing of a service from an arbitrary country.

FIG. 11 schematically illustrates a fixed network, a cellular system 51, an SSP 52, and SCP 53 and a fixed station 54 (as discussed earlier). The calling party, A-party 55 is abroad and makes a call to the B-party 56, which is a user of UPT, using DTMF signalling to FS 54. The Intelligent Network call sequence may be as follows when a calling party 55 makes a call to a B-party 56. The call may be of different kinds, such as an ordinary telephone call, a fax message or an e-mail. Thus calling party 55 makes a call and first accesses the SSP 52, indicated by arrow A, in the home country.

In the storing means of mobile station 55 instructions for handling accesses from different countries are contained and the mobile station 55 knows, via roaming updating in which country the user currently is. The call is routed via the SSP, as an IN-call, indirected through "B" in the figure. If it in SSP 52 is detected that the call is an IN call, a collection of call-related information, such as A-number, Calling Party Category etc. is initiated in SSP 52.

This information is transported to SCP 53, C, for further processing of the IN-call. Using the information received from SSP, SCP 53 establishes to which service the call relates. It is supposed that, relating to particular services, information is stored describing how to handle the call. When the IN-call processing is completed in SCP 53, SCP 53 provides SSP 52 (D) with instructions how to proceed with the call. SSP 52 may for example be instructed to route the call towards an end-user in the cellular network 51, e.g. B-party 56, E. When the user of mobile station 56 answers, F, a speech-channel connecting mobile stations 55, 56 is set-up in SSP 52.

What is claimed is:

1. A portable telecommunications unit providing access information for a number of protected subscriptions to at least one communications system wherein the giving of access code information is required, comprising storing means for storing at least access code information coded in DTMF, loudspeaker means, and processing means, wherein existing processing means, and loudspeaker means of said portable telecommunications unit are used for transmitting at least said DTMF-coded access code information to at least one fixed communications arrangement of said at least one communications system and of a network supported by said communications system, wherein the telecommunications unit further comprises activation means for a number of subscriptions to more than one communications system and/or telecommunication service and the activation of said activation means results in transmission of the access code information for providing a user with access to a selected communications system/telecommunication service, wherein DTMF-coded access number information for providing access from a plurality of different countries to at least one communication system/service are stored in the portable telecommunications unit, wherein processing means are provided for linking information about which is the country from which access is wanted to the relevant, stored access number and upon activation the relevant DTMF-coded access number is transmitted, wherein the portable telecommunications unit comprises localizing means for detecting in which country the portable telecommunications unit is and localizing information is linked to the processing means and the relevant access number is transmitted automatically when activating an activation key for transmitting access number information, wherein user interaction means are provided for enabling the user to activate the relevant access code information, and wherein DTMF-coded access number information can be provided and transmitted independently of whether radio contact can be established or not and independently of whether the user is a subscriber to the communications system, the localization information function of which is used, or not.

2. The portable telecommunication unit of claim 1, wherein the arrangement is a fixed station.

3. The portable telecommunication unit of claim 1, wherein the activation means comprises a number of keys.

4. The portable telecommunication unit of claim 1, wherein one communications system comprises a universal personal telecommunications mobility support network including cellular communication systems, fixed communication systems etc.

5. The portable telecommunication unit of claim 4, wherein the access code information comprises network access number and authentication information.

6. The portable telecommunication unit of claim 5, wherein the access code information comprises network access number, and personal user identification number.

7. The portable telecommunication unit of claim 5, wherein authentication is effected internally in a Service Control Point (SCP) of the universal personal telecommunications system.

8. The portable telecommunication unit of claim 5, wherein authentication is provided externally in at least one of an authentication center communicating with a service control point and a combined switching service control point of a universal telecommunications system.

9. The portable telecommunication unit of claim 2, wherein it further provides for controlling telecommunications and the portable telecommunications unit includes a display on which a user menu is presented when access successfully has been provided.

10. The portable telecommunication unit of claim 9, wherein the user menu comprises a voice menu interface for user interaction and on the menu a number of alternatives are given such as making outgoing calls, registering the location for incoming calls, modification or checking of service profile etc.

11. The portable telecommunication unit of claim 10, wherein the menu comprises a graphical menu.

12. The portable telecommunication unit of claim 10, wherein the menu comprises a voice menu.

13. The portable telecommunication unit of claim 10, wherein the menu is a combined graphic and voice menu.

14. The portable telecommunication unit of claim 10, wherein the menu is provided on a card.

15. The portable telecommunication unit of claim 1, wherein the activation means at least comprises first activation means which when activated transmits, coded in DTMF, the access information to a fixed arrangement via which the access information is requested by e.g. a database or a service or a private network.

16. The portable telecommunication unit of claim 15, the activation means comprises first activation means for a first mode of access and second activation means for a second mode of access, said first and second modes forming alternative modes.

17. The portable telecommunication unit of claim 16, wherein the first access mode provides for simplified access, in which all access information is sent without requiring intermediate user interaction and the second access mode is used for protected access to a subscription communications system, some user interaction being required to transmit all the access information.

18. The portable telecommunication unit of claim 1, wherein the telecommunication unit comprises a cordless telephone.

19. The portable telecommunication unit of claim 1, wherein the arrangement comprises a cellular telephone.

20. The portable telecommunication unit of claim 18, wherein the portable telecommunications unit includes a card reader device for UPT-cards.

21. The portable telecommunication unit of claim 1, wherein the portable telecommunications unit comprises a paging unit.

22. A system for providing a user with protected access to a telecommunications system supporting personal mobility wherein access to a subscription is provided through transmission of access number and authentication information coded in DTMF via a fixed telecommunications unit, wherein the system comprises a number of portable telecommunication units, which comprise storing means in which at least authentication information for at least one subscription is stored, processing means and loudspeaker means and wherein existing processing means and loudspeaker means of the portable telecommunication unit are used for transmitting at least the authentication information to an arbitrary fixed telecommunications unit, wherein the telecommunications system includes at least one of a cellular network, a fixed network and a private networks, supporting Universal Personal Telecommunications (UPT) and the authentication information is provided to a UPT database, access being enabled to a plurality of communication systems and/or services and independently of whether the user is a subscriber to the communications system; and access number information can be provided and transmitted independently of whether radio contact can be established or not; and localizing information for identifying a country which the portable telecommunication unit is in is used, or not.

23. The system of claim 22, wherein a portable telecommunication unit, when activated, emits a DTMF-coded personal identification number code and personal user identity code to an UPT-database requesting said codes via the fixed telephone.

24. The system of claim 22, wherein when protected access successfully has been provided, a service menu is shown on the portable telecommunication unit providing for user interaction and controlling capability.

25. A method for providing user access to and/or controlling ability of telecommunications supporting personal mobility in a number of networks such as one or more of a cellular network(s), fixed network(s) and business network (s) wherein for user access the giving of access code information comprising an access number and an authentication number is required the method comprising the steps of:

- in a portable telecommunications unit, storing the access number information for personal mobility user access,
- storing user authentication information,
- coding in processing means of the portable telecommunications unit the access number information and the authentication number information into DTMF-coded signal(s),
- activating said portable telecommunications unit, said activation resulting in retrieval of said access number information and/or authentications number information,
- placing loudspeaker means of the portable telecommunications unit close to a fixed telecommunications unit,
- emitting said DTMF-coded information to the fixed telecommunications unit,
- storing access code information for more than one communication system/service,
- via user interaction means selecting to which system/service access is wanted, and
- emitting the relevant access code information.
- wherein access code information can be provided and transmitted independently of whether contact can be established or not and independently of whether the user is a subscriber to the system/service and localizing information for identifying a country which the portable telecommunications unit is in is used, or not.

26. The method of claim 25, further comprising the steps of:

- storing in the portable telecommunications unit the access number information that is required to provide access from a plurality of different countries,
- automatically or manually indicating from which country access is wanted,
- linking said indication of country to the relevant stored access code information, and
- transmitting the relevant access code information
- wherein the user activates retrieval of the relevant access code information.

\* \* \* \* \*